US011794612B2

(12) United States Patent
Gumprecht et al.

(10) Patent No.: US 11,794,612 B2
(45) Date of Patent: Oct. 24, 2023

(54) VEHICLE SEAT AND VEHICLE SEAT SYSTEM FOR A MOTOR VEHICLE (71) Applicants: ZF AUTOMOTIVE GERMANY GMBH, Alfdorf (DE); FAURECIA AUTOSITZE GMBH, Stadthagen (DE)

(72) Inventors: Michael Gumprecht, Nassenfels (DE); Martin Seyffert, Pfullingen (DE); Artur Klein, Lorch (DE); Alexander Zagula, Iggingen (DE); David Reich, Berglen (DE); Swen Schaub, Göppingen (DE)

(73) Assignees: ZF AUTOMOTIVE GERMANY GMBH, Alfdorf (DE); FAURECIA AUTOSITZE GMBH, Stadthagen (DE)

( * ) Notice: Subject to any disclaimer, the term of this patent is extended or adjusted under 35 U.S.C. 154(b) by 352 days.

(21) Appl. No.: 16/644,552

(22) PCT Filed: Aug. 24, 2018

(86) PCT No.: PCT/EP2018/072855
§ 371 (c)(1),
(2) Date: Mar. 5, 2020

(87) PCT Pub. No.: WO2019/048256
PCT Pub. Date: Mar. 14, 2019

(65) Prior Publication Data
US 2020/0262316 A1 Aug. 20, 2020

(30) Foreign Application Priority Data
Sep. 11, 2017 (DE) .......................... 102017120939.5

(51) Int. Cl.
*B60N 2/829* (2018.01)
*B60N 2/02* (2006.01)
(Continued)

(52) U.S. Cl.
CPC ............. *B60N 2/0252* (2013.01); *B60N 2/20* (2013.01); *B60N 2/829* (2018.02);
(Continued)

(58) Field of Classification Search
CPC ........ B60N 2/0252; B60N 2/829; B60N 2/20; B60R 22/4604; B60R 22/18; B60R 2022/1818
See application file for complete search history.

(56) References Cited

U.S. PATENT DOCUMENTS 4,935,680 A * 6/1990 Sugiyama ............ B60N 2/0232
318/567
5,330,228 A * 7/1994 Krebs ..................... B60R 22/02
297/483

(Continued)

FOREIGN PATENT DOCUMENTS

DE        8608908.0        9/1987
DE        19524279        1/1997

(Continued)

OTHER PUBLICATIONS

Article entitled "Ruckhaltesysteme und Airbags", 2004, pp. 1-13.

*Primary Examiner* — Philip F Gabler
(74) *Attorney, Agent, or Firm* — TAROLLI, SUNDHEIM, COVELL & TUMMINO L.L.P.

(57) ABSTRACT

A vehicle seat (10) for a motor vehicle, having a backrest (12), a height-adjustable headrest (14) and a seatbelt guide (22) integrated in the vehicle seat (10) for a seatbelt (18), wherein the height-adjustable headrest (14) is coupled to the backrest (12), and wherein the headrest (14) can be mechanically coupled to a seatbelt guide adjusting mechanism (36), which mechanically adjusts the seatbelt guide (22) when adjusting the height of the headrest (14).

19 Claims, 4 Drawing Sheets

(51) Int. Cl.
  *B60N 2/20* (2006.01)
  *B60R 22/46* (2006.01)
  *B60R 22/18* (2006.01)

(52) U.S. Cl.
  CPC .......... *B60R 22/4604* (2013.01); *B60R 22/18* (2013.01); *B60R 2022/1818* (2013.01)

(56) References Cited

U.S. PATENT DOCUMENTS

| | | | | |
|---|---|---|---|---|
| 5,390,982 | A | * | 2/1995 | Johnson ................. B60N 2/829 297/483 |
| 5,658,048 | A | * | 8/1997 | Nemoto .................. B60R 22/20 297/410 |
| 5,658,051 | A | * | 8/1997 | Vega ....................... B60R 22/26 297/483 |
| 5,918,940 | A | * | 7/1999 | Wakamatsu ............. B60N 2/20 297/378.12 |
| 5,988,759 | A | | 11/1999 | Bauer et al. |
| 6,811,186 | B1 | * | 11/2004 | Fraley .................... B60R 22/20 297/483 |

FOREIGN PATENT DOCUMENTS

| | | |
|---|---|---|
| DE | 19648974 | 5/1997 |
| DE | 19651014 | 7/1998 |
| DE | 19851650 | 5/2000 |
| DE | 60200856 | 6/2002 |
| DE | 102004039812 | 8/2005 |
| DE | 102007039735 | 2/2009 |
| GB | 2386831 | 1/2003 |
| JP | 2008143279 | 6/2008 |

* cited by examiner

VEHICLE SEAT AND VEHICLE SEAT SYSTEM FOR A MOTOR VEHICLE

RELATED APPLICATIONS

This application corresponds to PCT/EP2018/072855, filed Aug. 24, 2018, which claims the benefit of German Application No. 10 2017 120 939.5, filed Sep. 11, 2017, the subject matter of which are incorporated herein by reference in their entirety.

BACKGROUND OF THE INVENTION

The invention relates to a vehicle seat for a motor vehicle and a vehicle seat system for a motor vehicle.

Motor vehicles are known in the prior art, especially coupes, which comprise a vehicle seat with seatbelt guide through which the strap associated with the B-column of the motor vehicle is led, in order to make it easier for the vehicle passenger to manipulate it.

Furthermore, vehicle seats are known which comprise a backrest, a height-adjustable headrest, and a seatbelt guide integrated in the vehicle seat for a seatbelt. Such vehicle seats are also known as belt-integrated seats with corresponding height-adjustable headrest. Generally in this case the headrest is arranged on a side member which is formed separate from the backrest, by which the seatbelt guide as well as the headrest can be adjusted. Such a vehicle seat is described for example in DE 196 51 014 C1.

Such vehicle seats will be used increasingly in future, for example in automated or autonomous driving, where the driver no longer has to constantly monitor the system or the vehicle. Instead, the vehicle itself performs functions such as activating the blinker, changing lanes and holding lanes. This makes it possible for the driver to adopt a comfortable position in any desired setting of the seat within a given seat adjustment range. These seat positions may in particular differ from a given range of a normal position of the vehicle seat (hereinafter called, for simplicity, the normal position), for which presentday passenger protection concepts such as seatbelt systems have been developed. Such seat positions may also be adopted by the other vehicle passengers in automated or autonomously driving vehicles.

However, it has been found to be a disadvantage in the aforementioned vehicle seats that the vehicle seats need to have a very massive construction, since the headrest is mounted on the side member, and the headrest absorbs the forces occurring during an accident, which then need to be appropriately diverted through the side member. Furthermore, the adjusting of a vehicle seat to a comfort position for the vehicle passenger is very cumbersome, since various parameters of the vehicle seat need to be adjusted. The comfort position in particular describes a relaxation, resting or recumbent position of the vehicle seat.

The problem which the invention proposes to solve is to provide a vehicle seat of simple construction, which meets the safety requirements and provides a constantly optimal belt guidance for the vehicle passenger. Furthermore, the problem of the invention is to provide a vehicle seat and/or a vehicle seat system making possible a simple adjustment of the vehicle seat.

The problem is solved according to the invention by a vehicle seat for a motor vehicle, having a backrest, a height-adjustable headrest and a seatbelt guide integrated in the vehicle seat for a seatbelt, wherein the height-adjustable headrest is coupled to the backrest, and wherein the headrest can be mechanically coupled to a seatbelt guide adjusting mechanism, which mechanically adjusts the seatbelt guide when adjusting the height of the headrest.

SUMMARY OF THE INVENTION

The basic notion of the invention is to couple the seatbelt guide to the headrest in a mechanical manner, so that a mechanical adjustment of the headrest, especially a setting of the height of the headrest, results in a corresponding adjusting of the seatbelt guide. This ensures that the seatbelt guide and hence the strap of the seatbelt lying against the vehicle passenger always finds itself in an optimal position, especially as regards the height in the shoulder region of the vehicle passenger. This is due to the fact that the vehicle passenger usually adjusts the headrest of the vehicle seat to his body height, so that the seatbelt guide is adapted appropriately at the same time. Since the height-adjustable headrest is directly coupled to the backrest, the vehicle seat may accordingly have a slender configuration, because no massive side member is needed. Moreover, this makes it easier for the vehicle passenger to manipulate it, and no separate adjustment mechanisms are needed for the seatbelt guide height adjustment. In one embodiment, the headrest and the seatbelt guide adjusting mechanism are preferably permanently mechanically coupled to each other.

The backrest may comprise a headrest section, on which the headrest is movably mounted. Accordingly, it is ensured that the vehicle seat, especially the headrest as well as the headrest section of the backrest, can easily absorb the large loads occurring during an accident.

One aspect calls for the headrest to be designed free of the seatbelt guide. Accordingly, the strap of the seatbelt does not run through the headrest itself, but rather past the headrest, at least at the side. In this way, it is possible to provide a narrow headrest section of the backrest as well as a correspondingly narrow headrest in order to assure that the strap is guided along the shoulder region of the vehicle passenger.

Another aspect calls for the seatbelt guide adjusting mechanism to comprise a driver with a deflection section for the strap, comprising a bearing point for the strap. Thanks to the seatbelt guide adjusting mechanism, the height of the bearing point is mechanically adjusted when the height of the headrest is adjusted. The driver is likewise adjusted accordingly when the height of the headrest is adjusted. In this process, the driver carries along the strap appropriately in the region of the deflection section, thereby changing the bearing point of the strap on the deflection section. Accordingly, when the height of the headrest is adjusted, the height of the bearing point is changed in similar fashion relative to the height of the headrest, especially in relation to the backrest. This ensures that the strap is appropriately adapted to the shoulder region of the vehicle passenger on account of the height-adjusted deflection section, so that in a restraint situation, such as an accident, a maximum restraining action can be accomplished on the vehicle passenger through the strap of the seatbelt.

In particular, a reference point of the headrest and the deflection section constantly have a defined spacing from each other, regardless of the adjusted height of the headrest. The defined spacing is preferably constant, regardless of the adjusted height, so that the height of the headrest is adjusted in the same way as that of the deflection section, i.e., in dependence on each other. Hence, there is no (unwanted) relative movement between the headrest and the deflection section, since a changing of the height of the headrest results in a corresponding changing of the position of the deflection section, especially the height of the bearing point. This ensures that the deflection of the strap in the shoulder region of the vehicle passenger is constantly adapted to the height of the vehicle passenger. The height of the vehicle passenger is detected indirectly through the adjusted height of the headrest.

The height adjustment of the headrest may accordingly be viewed as a sensor for the adjustment of the seatbelt guide, especially for the adjustment of the deflection section of the seatbelt guide adjusting mechanism.

According to one embodiment, the headrest comprises a headrest base element to which the seatbelt guide adjusting mechanism is firmly connected. A cushion is arranged on the headrest base element, which can be made of metal or plastic, for comfortable supporting of the head of the vehicle passenger. The headrest base element in its substantially rigid configuration thus provides a point of engagement for the seatbelt guide adjusting mechanism.

In particular, the headrest base element is coupled to a movement guide provided on the backrest, along which the headrest can be moved in translation. The movement guide may be a rail or a rail system, along which the headrest can be moved, especially the headrest base element of the headrest. This ensures that the headrest can be moved up and down, substantially along a longitudinal axis of the backrest. The movement guide leads the headrest accordingly during its movement.

For example, the movement guide has detent regions in which the headrest base element is locked, so that the headrest can be adjusted in steps. For this, a mechanical height adjusting mechanism can be provided, by which the height of the headrest is adjusted.

According to one embodiment, at least one actuator is provided, which is mechanically coupled to the headrest base element in order to adjust the position of the headrest, especially in a continuous manner. Accordingly, an electromechanical height adjusting mechanism is provided for the headrest, which can be operated via a corresponding control element by the vehicle passenger. The actuator is operated in this case by a control and/or evaluation unit to move the headrest in the desired manner. The control and/or evaluation unit may be part of the vehicle seat or designed separate from it, and be integrated for example in a central control and/or evaluation unit of the motor vehicle.

The actuator may interact with the headrest base element via a transmission element, so that the rotary movement of an actuator designed as an electric motor is transformed into a translatory movement of the headrest, especially the headrest base element of the headrest. For this, the transmission element may comprise a spindle, among other things.

Consequently, the vehicle seat comprises a height adjusting mechanism for the headrest, having in particular a mechanical and/or electromechanical design.

Preferably, the entire seatbelt system is integrated in the vehicle seat, i.e., the belt retractor and/or a belt pretensioner are also arranged in the vehicle seat. The belt pretensioner may comprise a reversible belt pretensioner and/or an irreversible main pretensioner. The functions of the belt retractor and the belt pretensioner are well known to the skilled person from the prior art. The belt retractor and the belt pretensioner may each be actuated by the control and/or evaluation unit, which also operates the actuator of the height adjusting mechanism. Alternatively, a different control and/or evaluation unit may be provided, such as an executive control and/or evaluation unit of the motor vehicle and/or a vehicle passenger protection system.

According to a further aspect, the vehicle seat comprises a tilt adjusting mechanism for the backrest. Accordingly, it is possible to move the backrest of the vehicle seat from a normal position to a different position outside the normal position, especially a comfort position. The comfort position is, for example, a relaxation or resting position in which the backrest is moved or angled further backward and/or downward than is the case in the normal position.

Moreover, the backrest can be divided into at least two sections which can be adjusted towards each other, in order to achieve the most optimal and comfortable vehicle seat position for the vehicle passenger. This relative adjustment may be done independently of each other or depending on each other, especially through an appropriately designed coupling of the two sections. The two sections of the backrest are joined together for example by a hinge unit, so that they can be moved relatively to each other.

In general, at least one backrest actuator can be provided, by which the backrest can be adjusted electromechanically, i.e., at least the inclination of the backrest. Furthermore, by means of the same backrest actuator or a different backrest actuator it is possible to adjust the two sections of the backrest relative to each other, for example in order to achieve a better vehicle seat geometry for the vehicle passenger.

Moreover, a height adjusting mechanism for the headrest can be provided, being coupled at least by control engineering to the tilt adjusting mechanism for the backrest, so that a changing of the inclination of the backrest results in a changing of the height of the headrest.

Insofar as the vehicle seat is moved from a normal position to a different position, especially the comfort position, the height of the headrest in addition to the backrest will be adjusted at the same time, in order to provide an optimal position for the vehicle passenger. Since the strap guidance is adjusted mechanically (automatically) at the same time as the height of the headrest by means of the seatbelt guide adjusting mechanism, this results in a comfortable position for the vehicle passenger, in which they are still optimally protected by the seatbelt. Preferably, the control and evaluation unit comprises an algorithm, which initiates a height adjustment of the headrest in dependence on an adjustment angle of the backrest. The algorithm in particular may be designed so that a coupled adjustment occurs only at a predetermined tilt angle of the backrest. The predetermined tilt angle of the backrest may correspond for example to the tilt angle at which the inclination of the backrest no longer corresponds to the normal position.

For example, it is possible for the vehicle passenger to reconfigure his vehicle seat in an extreme setting of the vehicle seat as a recliner, where his head is still resting on the headrest, especially the cushion, and at the same time the strap of the seatbelt runs closely around his body, especially his shoulder region.

The vehicle passenger may generally perform the adjustment of the headrest and/or the tilting of the backrest by using a data entry unit of the motor vehicle, such as a control unit of the motor vehicle, comprising corresponding control elements. Depending on the operation of the data entry unit, which is coupled to the control and/or evaluation unit, the actuator and/or the backrest actuator will be actuated to implement the desired setting. This functionality may be provided through an appropriately configured vehicle seat system.

Moreover, it may be provided that the tilt adjusting mechanism and the height adjusting mechanism are coupled together mechanically. In this way, a changing of the inclination of the backrest automatically produces a corresponding change in the height of the headrest and thus that of the seatbelt guide.

The vehicle seat may comprise a seat shell, having a seat shell deflection region of the seatbelt guide. The strap in a starting position preferably lies against a seat shell bearing point in the seat shell deflection region. Accordingly, the strap is led through the seat shell deflection region, which has a corresponding opening for the strap, so that the vehicle seat, especially its seat shell, is itself part of the seatbelt guide.

The starting position is in particular a position in which the headrest and the seatbelt guide adjusting mechanism coupled to the headrest have a minimal height and find themselves in the lowermost setting. Accordingly, the strap in this position lies both against the bearing point of the deflection section of the driver and against the seat shell bearing point of the seat shell deflection region. If the headrest and the seatbelt guide adjusting mechanism mechanically coupled firmly to it are moved upward, the driver carries along the strap accordingly, so that it is lifted off from the seat shell bearing point, such that the strap no longer needs to lie against the seat shell bearing point.

In another embodiment of the vehicle seat, the mechanical coupling of the height-adjustable headrest and the seatbelt guide adjusting mechanism can be decoupled. In particular, the height-adjustable headrest and the seatbelt guide adjusting mechanism in a basic setting can be adjusted by a vehicle passenger in a starting position independently of each other and the coupling of the height-adjustable headrest and the seatbelt guide adjusting mechanism occurs only after adjusting the starting position by the vehicle passenger. Thanks to the coupling only after the setting of the starting position, on the one hand at first an optimal or comfortable position of the headrest and the seatbelt guide relative to each other can be adjusted, and on the other hand during further use the headrest and the seatbelt guide are coupled in their relative position to each other during a further adjustment or movement of the vehicle seat by the vehicle passenger. For example, the control and/or evaluation unit may comprise suitable control and/or decoupling elements for the mechanical decoupling of the headrest and the seatbelt guide adjusting mechanism in the basic setting or for the basic setting.

The problem is furthermore solved according to the invention by a vehicle seat system for a motor vehicle, having a control and/or evaluation unit and a vehicle seat of the aforementioned kind, wherein the control and/or evaluation unit is electrically connected to at least one actuator in order to actuate it. Accordingly, the control and/or evaluation unit actuates the at least one actuator, by which the vehicle seat can be adjusted. In particular, the actuator for the headrest and/or the backrest of the vehicle seat is actuated by the control and/or evaluation unit. The vehicle seat system may be formed by a vehicle seat having a correspondingly integrated control and/or evaluation unit. Moreover, the control and/or evaluation unit may be designed separate from the vehicle seat, corresponding cables being provided for signal transmission between the control and/or evaluation unit and the vehicle seat.

Accordingly, the at least one actuator can be coordinated with a tilt adjusting mechanism and/or a height adjusting mechanism for the headrest. In particular, multiple actuators may be provided in order to adjust the backrest and the headrest, for example independently of each other through multiple actuators.

For this, the vehicle passenger can move the position of the components of the vehicle seat by appropriate control units, so that the backrest and/or the headrest are adjusted accordingly. Alternatively or additionally, the vehicle passenger (in a particular operating mode) of the motor vehicle can select predetermined settings in which the headrest and/or the backrest are adjusted accordingly by the control and/or evaluation unit putting out the actuating signals.

According to a further aspect, at least one sensor is provided, wherein the control and/or evaluation unit is adapted to actuate the at least one actuator in dependence on data acquired by the sensor.

Preferably the sensor or sensors are seat-integrated sensors for determining the position of the vehicle seat. Furthermore, the sensor may be an optical sensor, such as a camera, which detects the position of the vehicle passenger and/or the vehicle seat, especially the inclination of the vehicle seat. The actuator is then operated in dependence on the seat position of the vehicle passenger or the attitude of the vehicle seat, in order to change the height of the headrest accordingly.

Moreover, the at least one sensor may be a position sensor, which detects a change in position of the vehicle seat, especially the backrest, in order to thereupon actuate the backrest and/or the headrest accordingly.

A further aspect calls for the control and/or evaluation unit to be adapted to store and process data acquired by the sensor and/or to apply learning models to the data acquired by the sensor. In this way, it is possible to use at least one digital algorithm in order to undertake the corresponding settings of the vehicle seat, depending on the detected position of the vehicle passenger and/or the vehicle seat. Through the at least one digital algorithm which is used, it is possible among other things to implement a corresponding machine learning function.

BRIEF DESCRIPTION OF THE DRAWINGS

Further benefits and attributes of the invention will emerge from the following specification and the drawings, to which reference is made. The drawings show.

DESCRIPTION

Figure 1:
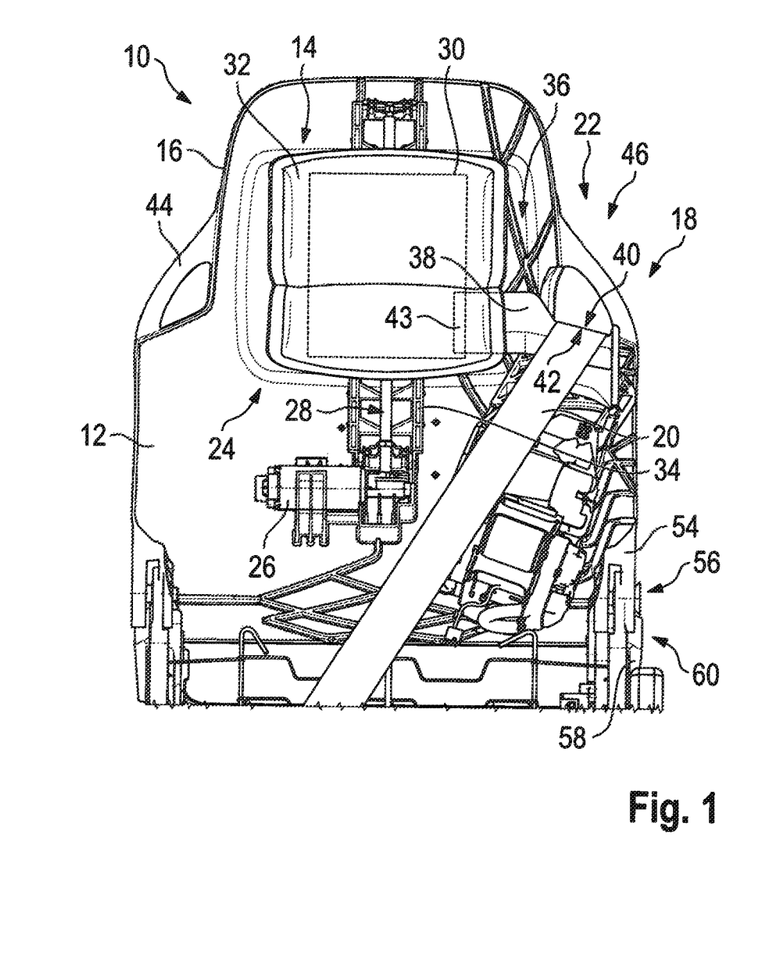
FIG. 1, a front view of a vehicle seat according to the invention in a first position, FIG. 2, the vehicle seat of FIG. 1 in a second position, FIG. 3, a first perspective view of the vehicle seat of FIG. 1, FIG. 4, a first perspective view of the vehicle seat of FIG. 2, FIG. 5, a second perspective view of the vehicle seat of FIG. 1, FIG. 6, a second perspective view of the vehicle seat of FIG. 2, and FIG. 7, a schematic representation of a vehicle seat system according to the invention, in which the vehicle seat finds itself in two different positions.
Figure 2:
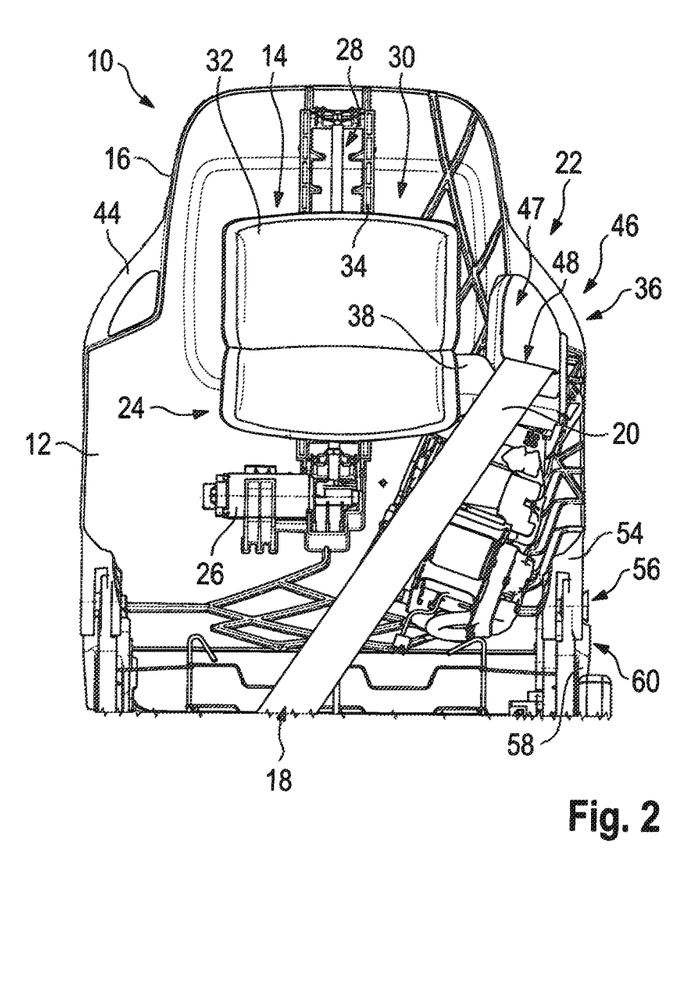
Figure 3:
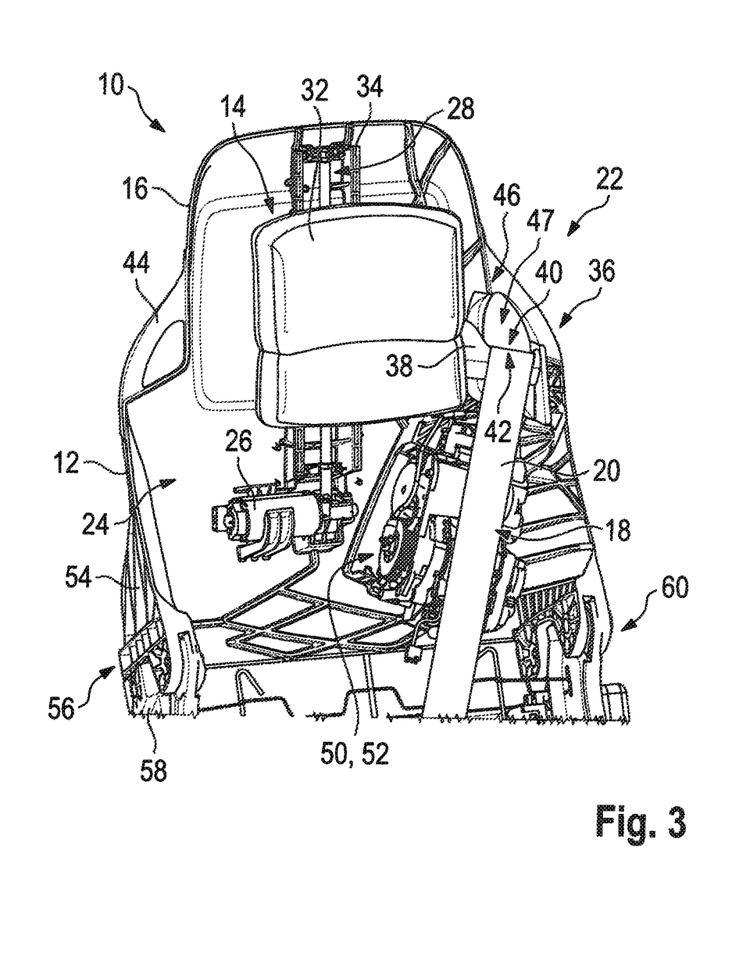
Figure 4:
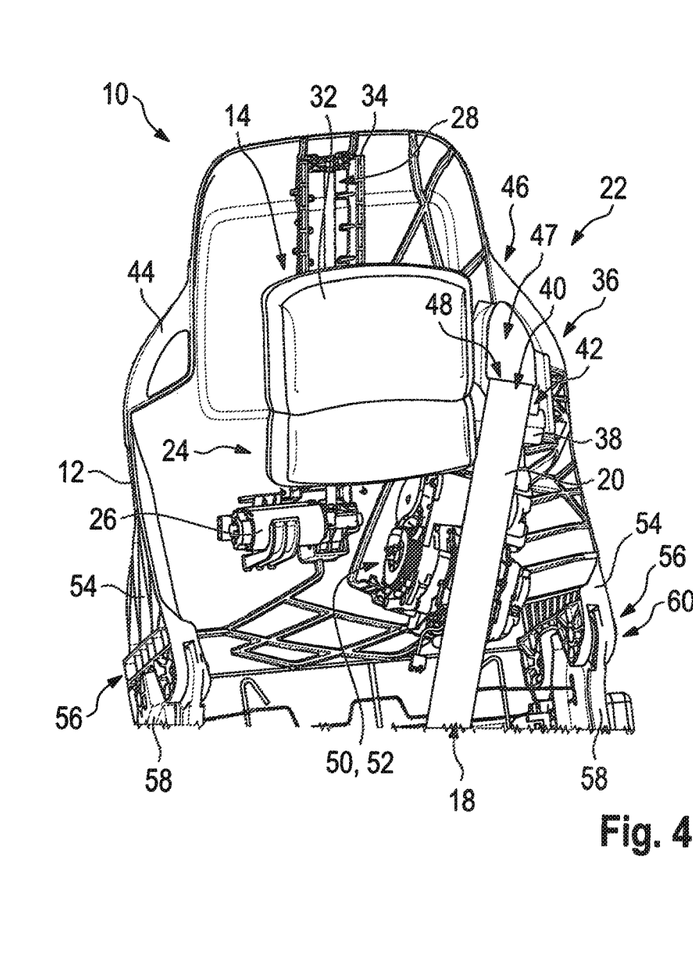
Figure 5:
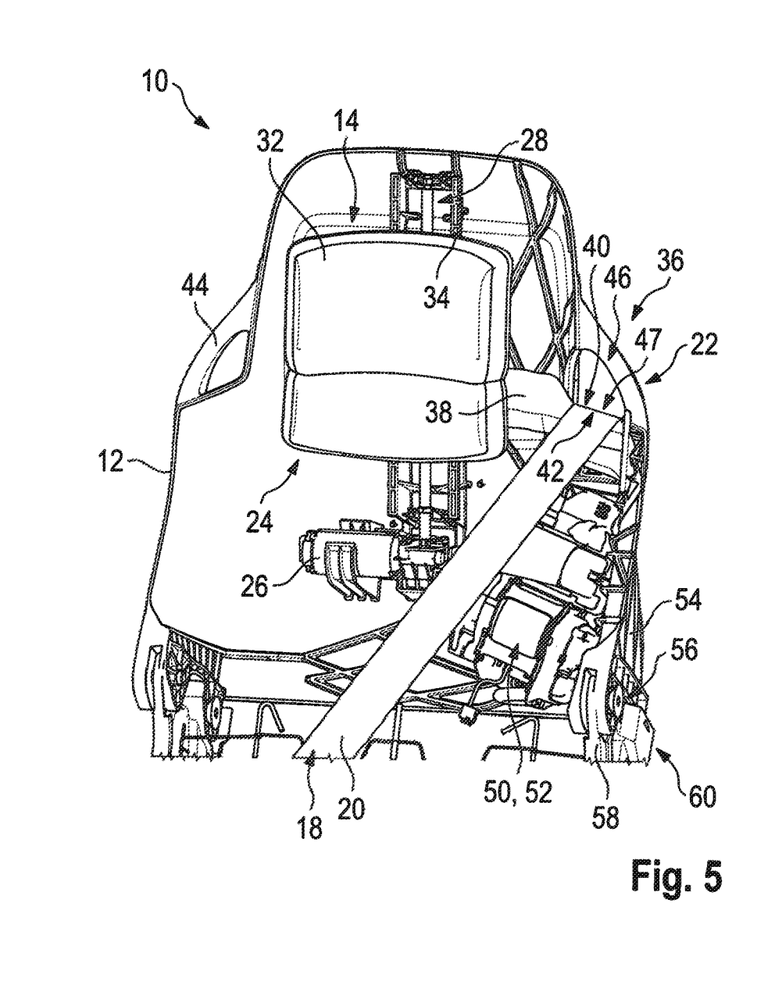

In FIGS. 1 to 6 a vehicle seat 10 according to the invention is shown in various perspectives, respectively in two different positions. The vehicle seat 10 in FIGS. 1, 3 and 5 is shown in a first position and in FIGS. 2, 4 and 6 in a second position, which can also be called the starting position.

The vehicle seat 10 comprises an adjustable backrest 12 and a height-adjustable headrest 14, associated with a headrest section 16 of the backrest 12.

Moreover, the vehicle seat 10 comprises a seatbelt system with a seatbelt 18, having a strap 20 that is led through a seatbelt guide 22. The seatbelt guide 22 and the seatbelt system are integrated in the vehicle seat 10, thus being a seat-integrated seatbelt 18 in the embodiment depicted.

The vehicle seat 10 moreover comprises a height adjusting mechanism 24 for the headrest 14, by which the headrest 14 can be adjusted accordingly in height relative to the headrest section 16 of the backrest 12. In the starting position of FIGS. 2, 4 and 6, the headrest 14 is in a lowermost setting, For this, the height adjusting mechanism 24 in the embodiment shown comprises an actuator 26, which is coupled to a transmission element 28. The transmission element 28 is arranged between the actuator 26 and the headrest 14. In the embodiment shown, the transmission element is arranged on a headrest base element 30 of the headrest 14, to which a cushion 32 of the headrest 14 is fastened. The headrest base element 30, which is arranged behind the cushion 32 in the figures, is merely suggested in FIG. 1.

The headrest base element 30 moreover is guided in its movement by a movement guide 34 provided on the backrest 12, here, on the headrest section 16. The movement guide 34 is likewise part of the height adjusting mechanism 24. The movement guide 34 ensures that the headrest 14 can be adjusted in height by translation through its headrest base element 30, insofar as the actuator 26 drives the transmission element 28 accordingly.

The actuator 26 may be an electric motor whose rotary motion is transformed by a transmission element 28 into a translatory motion, so that the headrest base element 30 coupled to the transmission element 28 can be moved accordingly in translation along the movement guide 34. For this, the transmission element 28 may comprise a spindle and/or a gearing, among others.

For example, the movement guide 34 is fashioned as a rail or a rail system, by which on the one hand the correspondingly adapted headrest base element 30 is held securely and on the other hand it can be guided in its movement.

The height adjusting mechanism 24 is moreover firmly coupled to a seatbelt guide adjusting mechanism 36, by which the seatbelt guide 22 can be adjusted.

Since the seatbelt guide adjusting mechanism 36 is coupled firmly to the height adjusting mechanism 24, the seatbelt guide 22 is adjusted automatically in a mechanical manner when the height of the headrest 14 is adjusted. For this, the seatbelt guide adjusting mechanism 36 comprises a driver 38, having a deflection section 40 for the strap 20. Accordingly, the deflection section 40 comprises a bearing point 42 and a bearing line for the strap 20, across which the strap 20 is led accordingly.

The driver 38 of the seatbelt guide adjusting mechanism 36 is firmly connected to the headrest base element 30, so that the height adjustment of the headrest 14 results in a corresponding translatory motion of the driver 38, whereby the bearing point 42 of the strap 20 on the deflection section 40 is changed accordingly in its height. The corresponding firm coupling 43 of the driver 38 to the headrest base element 30 is likewise merely suggested in FIG. 1, since it is concealed by the cushion 32 of the headrest 14.

Consequently, a reference point of the headrest 14, such as the midpoint of the cushion 32, and the deflection section 40 always have a defined spacing from each other in terms of height, this defined spacing being independent of the adjusted height of the headrest 14 and accordingly remains constant when the height of the headrest 14 is adjusted.

Figure 6:
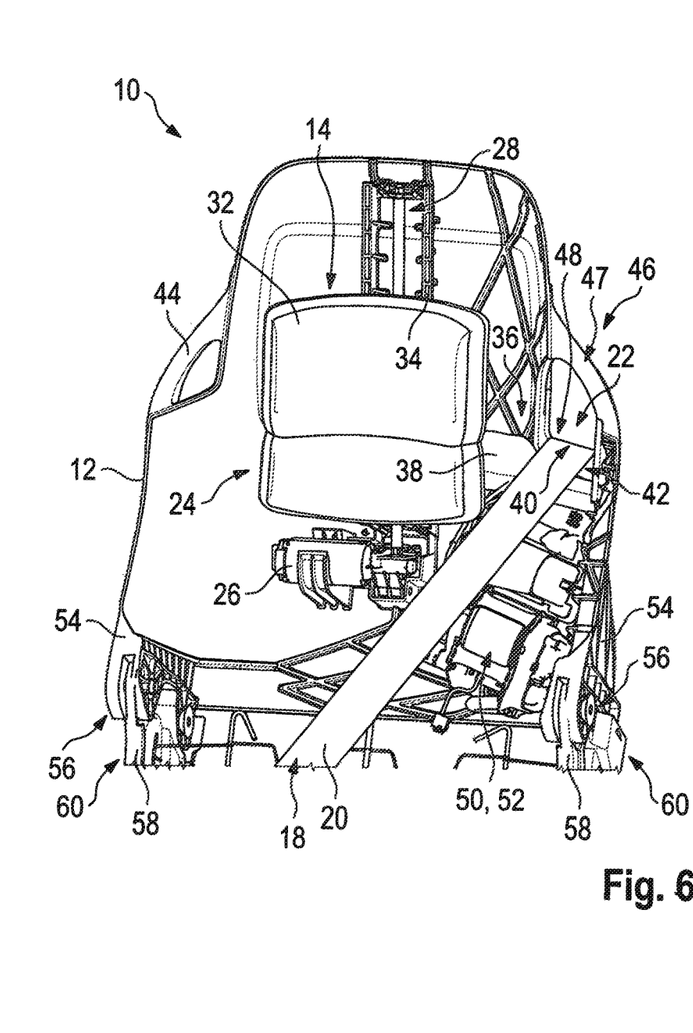

This is shown vividly by a corresponding comparing of FIGS. 1 and 2, FIGS. 3 and 4, as well as FIGS. 5 and 6, in which the headrest 14 of the vehicle seat 10 is represented each time in two different positions from three different perspectives.

It is clear from FIGS. 2, 4 and 6, where the headrest of the vehicle seat 10 is shown in the starting position or lowermost setting, that the vehicle seat 10 comprises a seat shell 44, defining a seat shell deflection region 46 for the strap 20, i.e., a region of the seatbelt guide 22 in which the strap 20 is deflected by the seat shell 44.

This seat shell deflection region 46 comprises an opening 47 in the seat shell 44 through which the strap 20 is led.

The strap 20 in the starting position or lowermost setting of the headrest 14 of the vehicle seat 10 lies against a correspondingly designed seat shell bearing point 48 in addition to the bearing point 42 on the driver 38, as shown in FIGS. 2, 4 and 6. Consequently, the strap 20 in the starting position of the headrest 14 of the vehicle seat 10 lies against two different bearing points 42, 48, which are associated with the shoulder region of the vehicle passenger.

It is especially evident from FIGS. 3 and 4 that the vehicle seat 10 additionally comprises a belt retractor 50 and a belt pretensioner 52, by which the strap 20 is pulled in or (pre)tensioned. Accordingly, the vehicle seat 10 despite its compact design affords corresponding comfort and safety functions of a traditional vehicle seat in combination with a separate restraint system situated in a vehicle.

Moreover, it is already evident from FIGS. 3 to 6 that the backrest 12 comprises, besides the headrest section 16, also an upper section 54, which is coupled by an appropriately designed joint 56 to a lower section 58. Accordingly, the backrest 12 itself can be adjusted, as is shown especially in FIG. 7, which will be taken up further below.

Consequently, the vehicle seat 10 comprises, besides the height adjusting mechanism 24 for the headrest 14 and the seatbelt guide adjusting mechanism 36, by which the seatbelt guide 22 is adjusted uniformly with the headrest 14, also a tilt adjusting mechanism 60, by which the inclination of the vehicle seat 10 can be adjusted, especially the inclination of the backrest 12.

The tilt adjusting mechanism 60 for the backrest 12 may be coupled at least by control engineering to the height adjusting mechanism 24, so that the position of the headrest 14 and therefore the position of the seatbelt guide 22, especially the bearing point 42, is changed in dependence on the adjusted inclination of the backrest 12.

Moreover, a mechanical coupling of the tilt adjusting mechanism 60 and the height adjusting mechanism 24 may be present, so that the height adjusting mechanism 24 is automatically activated when the inclination of the backrest 12 is to be adjusted via the tilt adjusting mechanism 60.

Figure 7:
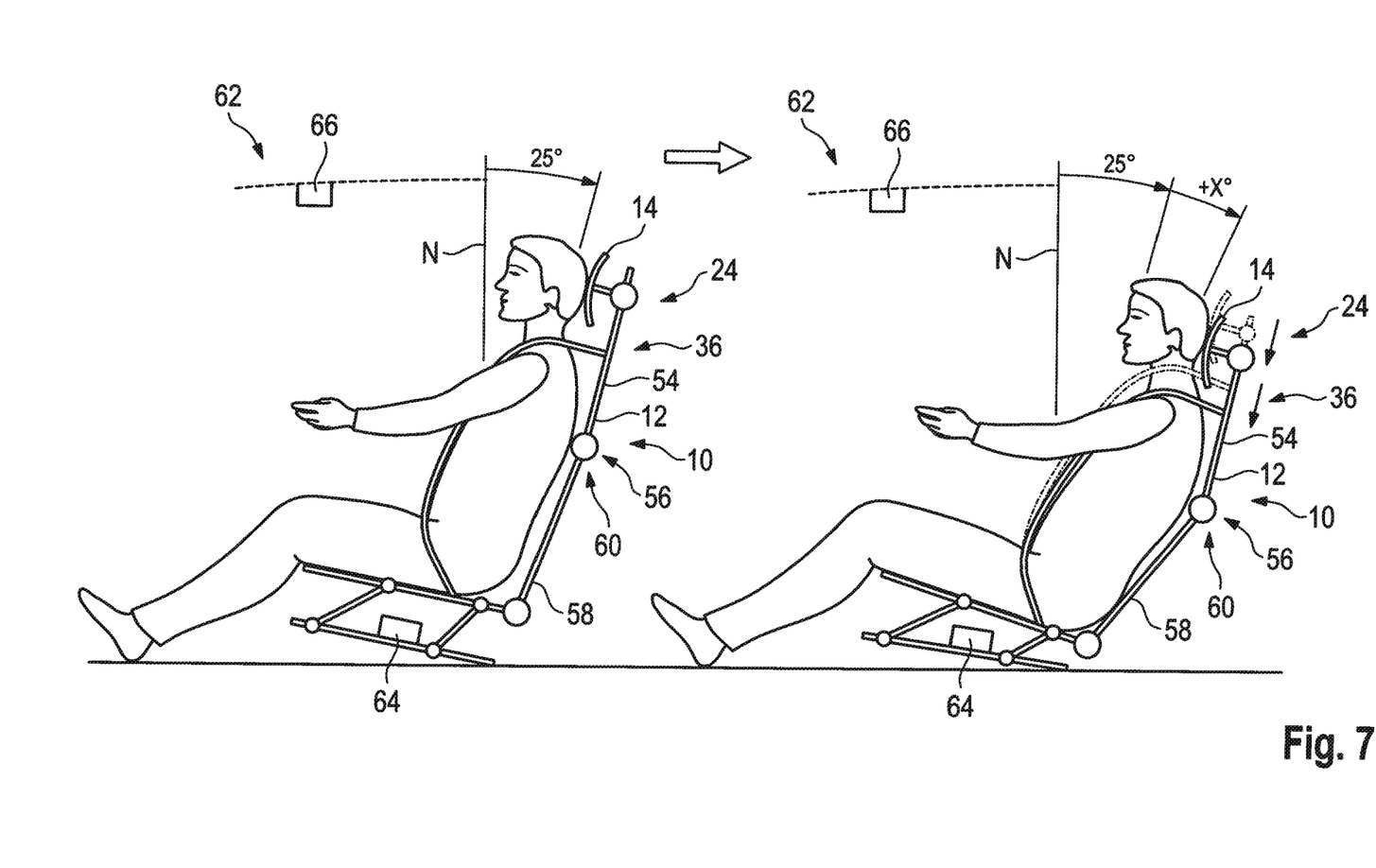

FIG. 7 shows, at the left side of the figure, a driving position of the vehicle seat 10, in which the vehicle seat 10 substantially has an inclination of around 25° in relation to a normal N emerging from the vehicle floor. The backrest 12 is accordingly adjusted from its perpendicular position by an angle of 25°, with the vehicle passenger serving as a reference here. This position corresponds substantially to a normal position of the vehicle seat.

On the right side of FIG. 7, on the other hand, is shown another position different from the driving position, corresponding to one possible comfort position. In this position, the backrest 12 is tilted further back relative to the depicted normal position, namely, by "+X°".

In the representation shown, the two sections 54, 58 of the backrest 12 are likewise adjusted relative to each other by the joint 56, so that not only the inclination of the backrest 12, but also the shape of the backrest 12 has been adjusted.

Accordingly, the tilt adjusting mechanism 60 also comprises a shape adjusting mechanism for the backrest 12.

As already mentioned, the tilt adjusting mechanism 60 is coupled to the height adjusting mechanism 24, preferably by control engineering, so that a change in the inclination of the backrest 12 results (automatically) in a change in the height adjustment of the headrest 14. Accordingly, the position or the height of the headrest 14 in relation to the backrest 12 is automatically adapted in dependence on the adjusted inclination of the backrest 12 adjusted by the tilt adjusting mechanism 60, as is shown in FIG. 7. As shown in FIG. 7, a backward adjusting of the inclination of the backrest 12 results in the headrest 14 also being automatically pushed downward.

Accordingly, the seatbelt guide 22, especially the bearing point 42, is likewise automatically adapted, namely, by the driver 38 of the seatbelt guide adjusting mechanism 36, which is mechanically coupled to the headrest 14, as was explained for FIGS. 1 to 6.

It may be provided that the vehicle seat 10 is part of a vehicle seat system 62, comprising a control and/or evaluation unit 64, which is integrated for example in the vehicle seat 10.

Alternatively, the control and/or evaluation unit 64 may be separate in design, for example, being part of an executive vehicle control system, by which the belt retractor 50 and the belt pretensioner 52 are also actuated.

Regardless of the arrangement of the control and/or evaluation unit 64, this can actuate the height adjusting mechanism 24 of the headrest 14 and/or the tilt adjusting mechanism 60 for the backrest 12 (each individually), especially a corresponding actuator of the height adjusting mechanism 24 and the tilt adjusting mechanism 60, which can also be called a backrest actuator.

Moreover, the control and/or evaluation unit 64 may be electrically coupled to a sensor 66 or multiple sensors 66, in order to evaluate accordingly the data acquired by the sensor 66.

The sensor 66 in the embodiment shown is an optical sensor, such as a camera, which is arranged on the vehicle ceiling. The sensor 66 acquires the position of the vehicle passenger or the position of the vehicle seat 10.

On the basis of the position of the vehicle seat 10 as detected by the sensor 66, especially the position of the backrest 12, the control and/or evaluation unit 64 can actuate the height adjusting mechanism 24 accordingly when adjusting the inclination of the backrest 12, in order to move the headrest 14 automatically into a corresponding position. This will ensure that the headrest 14 constantly finds itself in the optimal position in relation to the adjusted position of the backrest 12, especially depending on the vehicle passenger.

The seatbelt guide 22 by virtue of the height adjustment of the headrest 14 is automatically adapted by the seatbelt guide adjusting mechanism 36 according to the adjusted height of the headrest 14, as indicated by the arrows shown in FIG. 7.

In particular, it can be seen from FIG. 7 that the headrest 14 is pushed downward when changing from the driving position to the relaxation or resting position, whereupon the seatbelt guide 22, especially the bearing point 42 for the strap 20, is likewise moved downward (by the same distance) in translation relative to the backrest 12.

Alternatively to the optical sensor, the sensor 66 may be arranged on the vehicle seat 10 in order to detect the correspondingly adjusted position of the vehicle seat 10 there.

Moreover, the sensor 66 may be part of the control and/or evaluation unit 64, so that a control by the vehicle passenger is appropriately detected, and at the same time the control and/or evaluation unit 64 will actuate the tilt adjusting mechanism 60 and the height adjusting mechanism 24.

In general, the control and/or evaluation unit 64 may be adapted to store and process data acquired by the sensor 66 and/or to apply learning models to the data acquired by the sensor 66. In this way, it is possible for the control and/or evaluation unit 64 to automatically recognize and learn which height adjustment should be provided for the headrest 14 and thus accordingly for the seatbelt guide 22 for a given adjustment of the vehicle seat 10 by means of the tilt adjusting mechanism 60.

Since the seatbelt guide 22 is constantly adapted to the height of the headrest 14, it is ensured that an optimal position of the strap 20 is constantly assured in the shoulder region of the vehicle passenger.

Since the height adjusting mechanism 24 of the headrest 14 is coupled to the tilt adjusting mechanism 60, it is furthermore assured that a comfortable position for the vehicle passenger in regard to the headrest 14 is always present. Namely, the position of the headrest 14 is adapted to the correspondingly adjusted inclination of the backrest 12.

The invention claimed is:

1. A vehicle seat (10) for a motor vehicle, having a backrest (12), a height-adjustable headrest (14) and a seatbelt guide (22) integrated in the vehicle seat (10) for a seatbelt (18), wherein the height-adjustable headrest (14) is coupled to a headrest section (16) of the backrest (12), the headrest (14) having a first surface configured to receive a vehicle occupant's head and an opposite second surface directly facing the headrest section (16) such that the headrest (14) overlies the headrest section (16) in a direction that is transverse to a height-adjusting direction of the headrest (14), the headrest (14) moving along the headrest section (16) in the height-adjusting direction during a height-adjustment of the headrest (14), and wherein the headrest (14) is mechanically coupled to a seatbelt guide adjusting mechanism (36), which mechanically adjusts the seatbelt guide (22) when a height of the headrest (14) is adjusted.

2. The vehicle seat as claimed in claim 1, wherein the headrest (14) is permanently mechanically coupled to the seatbelt guide adjusting mechanism (36).

3. The vehicle seat (10) as claimed in claim 1, wherein the headrest (14) is designed free of the seatbelt guide.

4. The vehicle seat (10) as claimed in claim 1, wherein the seatbelt guide adjusting mechanism (36) comprises a driver (38) with a deflection section (40) for a seatbelt strap (20), the deflection section (40) comprising a bearing point (42) for the seatbelt strap (20), the seatbelt guide adjusting mechanism (36) mechanically adjusting the height of the bearing point (42) when the height of the headrest (14) is adjusted.

5. The vehicle seat (10) as claimed in claim 1, wherein the seatbelt guide adjusting mechanism (36) comprises a driver (38) with a deflection section (40) for a seatbelt strap (20), and wherein a reference point of the headrest (14) and the deflection section (40) constantly have a defined spacing from each other, regardless of the adjusted height of the headrest (14).

6. The vehicle seat (10) as claimed in claim 1, wherein the headrest (14) comprises a headrest base element (30) to which the seatbelt guide adjusting mechanism (36) is firmly connected.

7. The vehicle seat (10) as claimed in claim 6, wherein the headrest base element (30) is coupled to a movement guide (34) provided on the backrest (12), along which the headrest (14) can be moved in translation.

8. The vehicle seat (10) as claimed in claim 6, wherein at least one actuator (26) is provided, which is mechanically coupled to the headrest base element (30) in order to adjust the position of the headrest (14).

9. The vehicle seat (10) as claimed in claim 1, wherein a belt retractor (50) and/or a belt pretensioner (52) is integrated in the vehicle seat (10).

10. The vehicle seat (10) as claimed in claim 1, wherein the vehicle seat (10) comprises a tilt adjusting mechanism (60) for the backrest (12).

11. The vehicle seat (10) as claimed in claim 10, wherein a height adjusting mechanism (24) for the headrest (14) is provided, being coupled at least by control engineering to the tilt adjusting mechanism (60) for the backrest (14), so that a changing of the inclination of the backrest (12) results in a changing of the height of the headrest (14).

12. The vehicle seat (10) as claimed in claim 1, wherein the vehicle seat (10) comprises a seat shell (44), having a seat shell deflection region (46) of the seatbelt guide (22), a seatbelt strap (20) in a starting position lying against a seat shell bearing point (48) in the seat shell deflection region (46).

13. The vehicle seat (10) as claimed in claim 1, wherein the height-adjustable headrest (14) and the seatbelt guide adjusting mechanism (36) in a basic setting can be adjusted by the vehicle occupant in a starting position independently of each other and the coupling of the height-adjustable headrest (14) and the seatbelt guide adjusting mechanism (36) occurs after adjusting the starting position, so that during further use the headrest (14) and the seatbelt guide (22) are coupled in their relative position to each other during a further adjustment of the vehicle seat (10).

14. A vehicle seat system (62) for a motor vehicle, having a control and/or evaluation unit (64) and a vehicle seat (10) as claimed in claim 1, wherein the control and/or evaluation unit (64) is electrically connected to at least one actuator (26) in order to actuate it.

15. The vehicle seat system (62) as claimed in claim 14, wherein the at least one actuator (26) is coordinated with a tilt adjusting mechanism (60) and/or a height adjusting mechanism (24) for the headrest (14).

16. The vehicle seat system (62) as claimed in claim 14, wherein at least one sensor (66) is provided, wherein the control and/or evaluation unit (64) is adapted to actuate the at least one actuator (26) in dependence on data acquired by the sensor (66).

17. The vehicle seat system (62) as claimed in claim 16, wherein the control and/or evaluation unit (64) is adapted to store and process data acquired by the sensor (66) and/or to apply learning models to the data acquired by the sensor (66).

18. The vehicle seat (10) as claimed in claim 1, further comprising a seat shell (44) having an opening (47) through which a strap (20) of the seatbelt (18) extends, wherein the seatbelt guide adjusting mechanism (36) comprises a driver (38) that is adjacent the opening (47) and fixed to the headrest (14), the driver (38) having a deflection section (40) for the seatbelt strap (20), the deflection section (40) having a bearing point (42) for engaging the seatbelt strap (20), a height-adjusting movement of the headrest (14) causing both the bearing point (42) to move relative to the opening (47) and a height of the bearing point (42) to be adjusted.

19. The vehicle seat (10) as claimed in claim 1, wherein the backrest (12) has a first section (54) coupled to a second section (58) by a joint (56), the headrest (14) being coupled to the first section (54) of the backrest (12), the second section (58) having a first end coupled to a seat base, the second section (58) extending away from the seat base to a second end, the second end of the second section (58) being connected to the joint (56), the vehicle seat (10) further comprising:
  a tilt adjusting mechanism (60) configured to adjust an inclination of the backrest (12) by adjusting the first and second sections (54, 58) of the backrest (12) relative to one another; and
  a height adjusting mechanism (24) for adjusting a height of the headrest (14), the height adjusting mechanism (24) being coupled to the tilt adjusting mechanism (60) so that an adjustment of the inclination of the backrest (12) results in an adjustment of the height of the headrest (14).

* * * * *